United States Patent [19]
Kienzle et al.

[11] 3,736,408
[45] May 29, 1973

[54] TAXI METER WITH AUTOMATIC RATE ADJUSTMENT

[75] Inventors: Herbert Kienzle, Villingen, Germany; Walter Dellheim, Long Island City, N.Y.; Heinz Kelch, Buchenberg, Germany

[73] Assignee: Kienzle Apparate GmbH, Villingen, Germany

[22] Filed: July 23, 1971

[21] Appl. No.: 165,854

[30] Foreign Application Priority Data

July 25, 1970 Germany.................P 20 37 048.3

[52] U.S. Cl..................................235/30, 235/45
[51] Int. Cl..............................................G07b 13/10
[58] Field of Search...................235/30 R, 33, 45

[56] References Cited

UNITED STATES PATENTS

| | | | |
|---|---|---|---|
| 1,744,307 | 1/1930 | Gluck | 235/30 R |
| 2,934,265 | 4/1960 | Sjöblom | 235/45 X |
| 3,249,296 | 5/1966 | Kelch | 235/30 R |
| 3,388,859 | 6/1968 | Kelch et al | 235/30 R |

FOREIGN PATENTS OR APPLICATIONS 264,026  12/1965  Australia...........................235/30 R Primary Examiner—Stephen J. Tomsky
Attorney—Michael S. Striker

[57] ABSTRACT

A known taxi meter computes fares at a first rate at the start on each ride and at a second rate upon completion of a predetermined time or mileage. Interconnected with this automatically shifting taxi meter is a time switch which causes the taxi meter to advance to the second rate immediately upon activation at determined times of the day or during holidays.

9 Claims, 4 Drawing Figures

Patented May 29, 1973  3,736,408
3 Sheets-Sheet 1
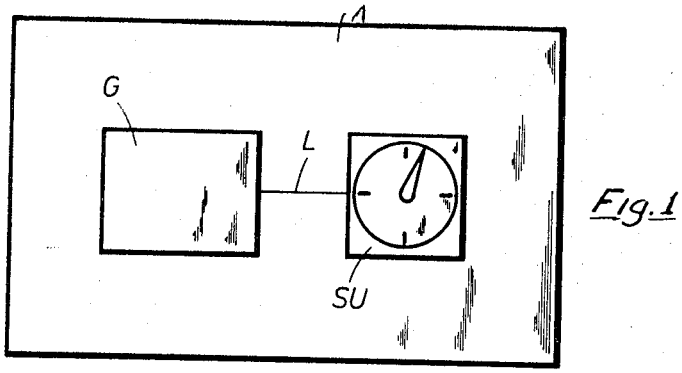
Fig.1
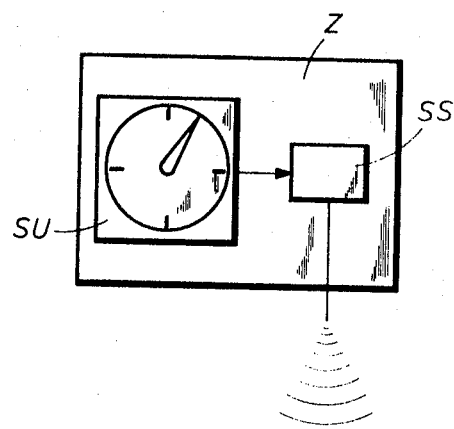
Fig.2
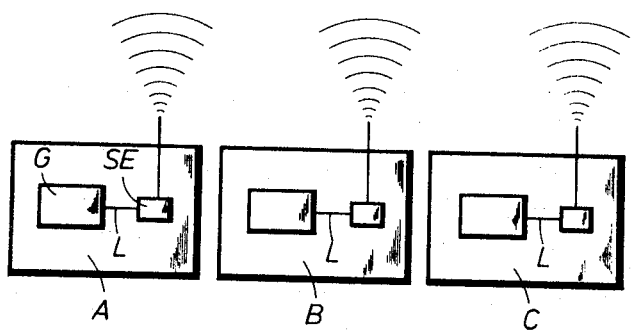
*Inventors*
Herbert Kienzle
Walter Dellheim
Heinz Kelch Patented May 29, 1973

Inventors
Herbert Kienzle
Walter Dellheim
Heinz Kelch

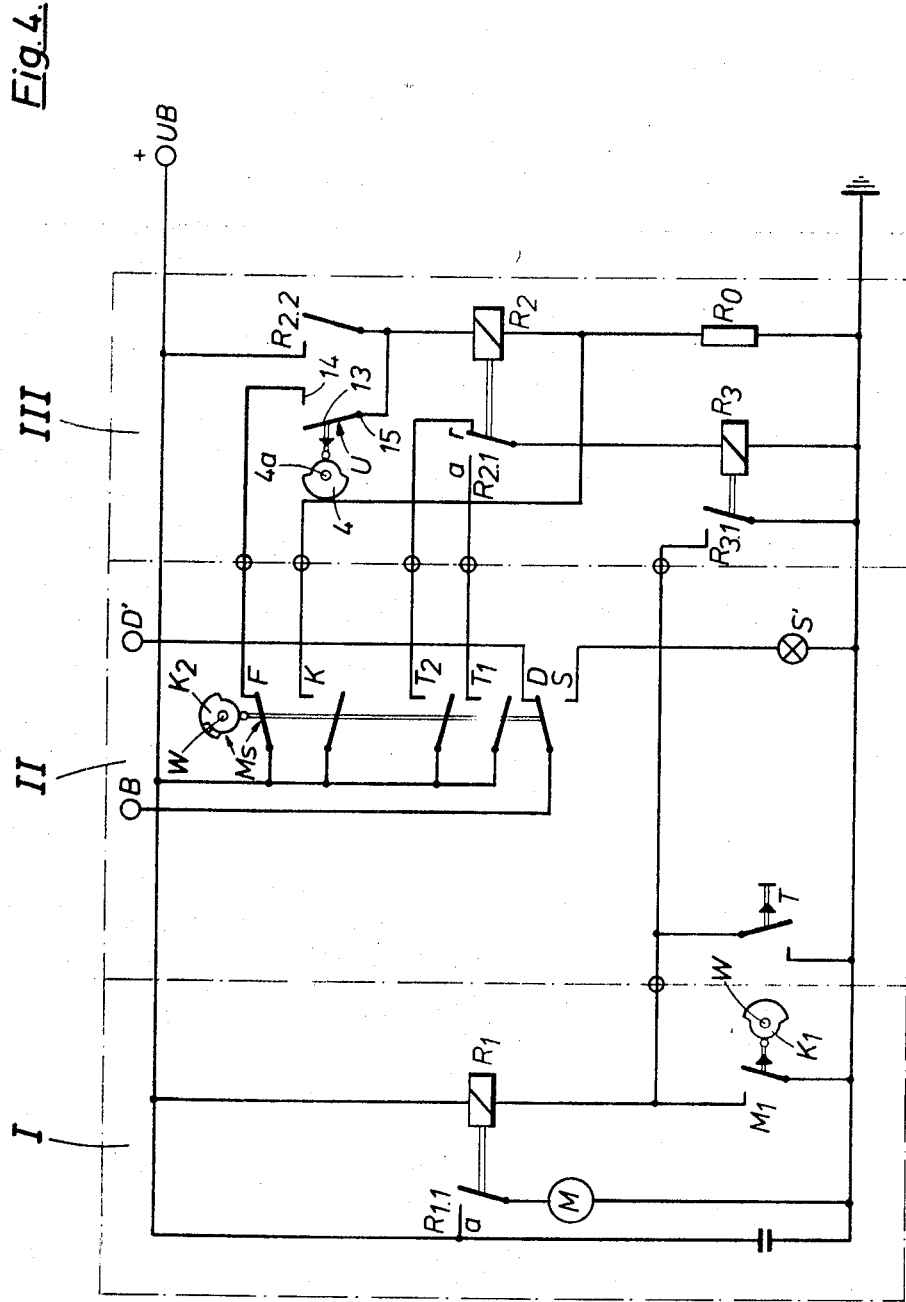

TAXI METER WITH AUTOMATIC RATE ADJUSTMENT

BACKGROUND OF THE INVENTION

This invention relates to taxi meters, and in particular to taxi meters which do not compute the fare at a single rate during the whole ride. In particular, it relates to such taxi meters which have computing means having a first stage wherein fare is computed at a first rate following for example activation of the meter, and a second stage wherein fare is computed at a second rate possibly after the completion of a predetermined time or mileage. Known arrangements of this type operate in one of two ways. First, it is possible that the switching from one rate to the other is under control of the driver, in which case complete confidence must be had that the driver will operate the vehicle correctly. In the second case, the rate change is automatic.

In one known automatic meter of the above-mentioned type, the rate change is effected by changing the gear ratio in the means which drive the meter in dependence on either the distance covered or the time spent waiting.

Another known arrangement is described in German Pat. No. 1,176,407. Here the rate change is effected by a notched lifting wheel. A lever lifted by said lifting wheel is operated by a blocking arrangement in such a manner that for a first rate it makes contact with only a selected number of the notches or teeth in the wheel, while for the higher rate, all notches or teeth are operative. When the second rate is to become effective, a switch control disk removes the blocking means from the lever.

In all the above arrangements, no consideration is given to the fact that it is much more difficult to obtain drivers and thus to provide adequate taxi service during particular times of the day, such as the night, or, alternatively, during particular times within the week or season, namely on Sundays and holidays.

SUMMARY OF THE INVENTION

It is an object of the present invention to combine a two-rate meter as set forth above with a time switch in such a manner that the higher rate becomes effective immediately upon start at predetermined times such as night time, holidays, or Sundays.

The present invention is a taxi meter arrangement which comprises computing means, namely the conventional taxi meter, having a first stage for computing the fare at a first rate and a second stage for computing the fare at a second rate. Further furnished are time switch means having a first state for at least one predetermined time interval during a selected calendar time range, and a second state. Further, connecting means connect said computing means and said time switch means in such a manner that said first stage is energized when said time switch means are in said first state and said second state is energized when said time switch means are in said second state.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a schematic representation of an arrangement of the present invention;

FIG. 2 is a schematic representation of a second embodiment of the present invention;

FIG. 4 shows the interconnection between the output of the time switch means and the computer means.

DESCRIPTION OF THE PREFERRED EMBODIMENTS

Figure 3:
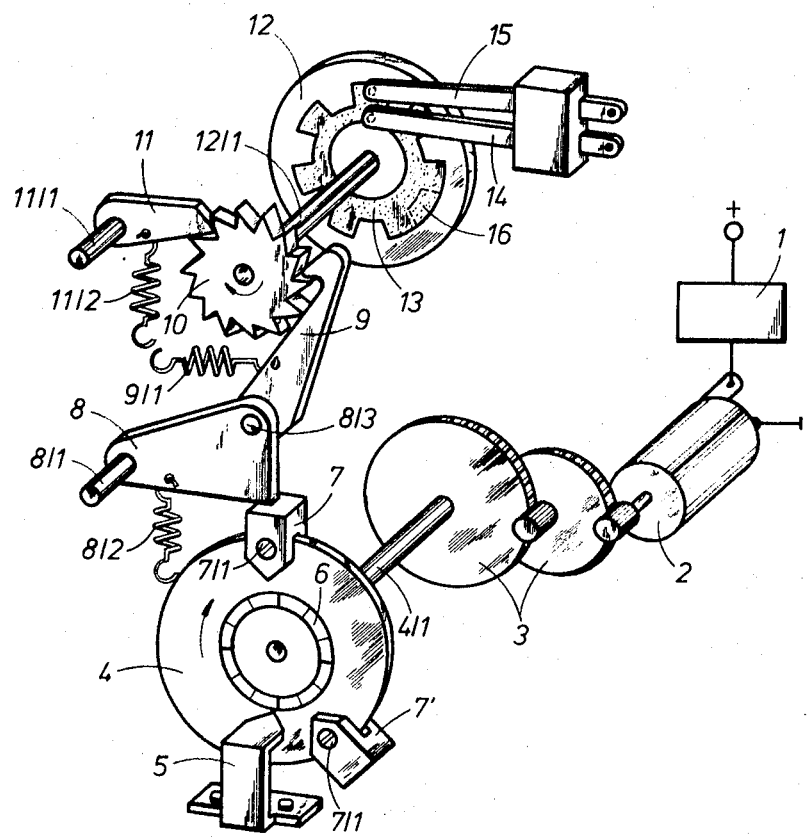
FIG. 3 shows the time switch means of the present invention.

A preferred embodiment of the present invention will now be discussed in relation to the drawing.

FIG. 1 shows one embodiment of the present invention, wherein the computing means labeled G are combined with a time clock, as for example illustrated in FIG. 3, by means of a connecting cable labeled L. The time clock is labeled SU in the Figure.

FIG. 2 shows an alternate embodiment wherein a central transmission station labeled Z has a time clock, again labeled SU, which again may be a clock as shown in FIG. 3 connected to transmission means labeled SS. Further shown in FIG. 2 are three blocks labeled A, B, and C, respectively, each of which represent a taxi cab. In each cab there is a receiver labeled SE which furnishes a receiver signal in response to the transmission from transmitter SS. The computer means, again labeled G, and again representing a standard tax meter having a two-rate structure, are connected to the receiver means by a cable L. The computing means are thus responsive to the received signal as will be discussed below.

The standard taxi meter labeled G in FIGS. 1 and 2 will now be described. As shown in more detail in FIG. 4, a conventional taxi meter comprises a first motor labeled M which has a first shaft labeled W. The shaft has cam means mounted thereon which control computer switch means in such a way that the switches F, T1, T2, and K are closed in that order. The closing of switch F represents the energization of stage 3, that is the stage wherein no fare is being computed. Closing of switch T1 represents energization of the first stage wherein fare is computed at a first rate, closing of switch T2 represents energization of the second stage, and closing of switch K represents energization of the fourth stage wherein the total fare is indicated.

Further mounted on shaft W, is a cam K1 which causes a switch M1 which is in series with the coil of a relay R1 to be closed each time the motor is started, and to be opened when the next one of the computer switch means is closed. The switch M1 in series with the coil of relay R1 is connected to the minus and plus terminals of a source of energy labeled UB. Relay coil R1 controls a pair of contacts R1.1 in such a way that the coil of the motor M is energized when relay 1 is energized, and de-energized when relay R1 is deenergized. Connected in parallel with switch M1 is a switch T which is subject to driver activation for starting the meter.

The standard taxi meter as shown in sections I, and II, of FIG. 4 would thus operate as follows: Assuming that switch F is in the closed position as shown in FIG. 4, it is first assumed that no passenger is in the taxi cab.

Upon entrance of a passenger into the cab, the driver closes switch T which energizes relay R1 in turn closing contact R1.1, thereby energizing the motor coil M. The turning of the motor immediately closes a switch M1 by means of cam K1, thereby retaining the energization of relay R1 even after switch T again opens. Relay R1 remains energized until switch T1 closes. At this point, switch M1 opens the energizing relay R1 and stopping the motor. The known meter can then operate in a number of ways. Either a new activation of switch T again energizes the motor as described above via switch M1 and relay R1 until such time as switch T2 closes. Alternatively, the motor can be activated automatically from closure of T1 to closure of T2 after receipt of a signal that a predetermined mileage or time has been completed. The actual mechanism is immaterial for the present invention. It suffices that a stage for computing at a first rate, energized by switch T1, and a switch for computing the fare at a second rate, energized by switch T2, be available.

Upon completion of the ride, the driver again depresses the switch T causing the motor to progress to the closing of switch K, wherein the total fare is indicated. A subsequent pushing of switch T then returns the meter to its original position. It must again be emphasized that cam K1 always causes closing of switch M1 when the motor is started and interrupts switch M1 when the next subsequent computer switch is closed.

It should also be noted that the switches D and S shown in FIG. 4 serve to provide illumination for the top light of the taxi and for the internal fare indication, respectively. They form no part of the present invention.

The operation of the stage denoted by III in FIG. 4 shows the interconnection between the time switch means and the standard taxi meter as described above. The description of this stage will follow description of FIGS. 2 and 3 which show two embodiments of the time switch means.

The system shown in FIG. 2 is particularly useful for radio-controlled taxi cabs wherein the receiver is used to receive particular orders from a central station as to where to pick up passengers, etc. Here a determined signal is generated by the transmitting station at the central location which is received by all of the radio-controlled taxi cabs. This signal has a determined frequency which is preferably outside of the audible region. The signals may, for example, be generated in all time intervals wherein the time switch means are to be in the first state which results in an increased rate of fare computation. The receiver may, for example, comprise filter and pulse-shaping means for shaping pulses out of the received signal. It may further comprise an electronic relay which is energized by the pulses and has a holding circuit which operates for a time interval exceeding the interval between pulses. Thus the relay remains energized closing the contacts of the time switch means for the whole time that the signal is being sent from the transmitting station.

Referring now to FIG. 4, the relay in the receiver means as described above may, for example, be used to close the variable arm 13 thereby closing the circuit from terminal 15 to terminal 14 during the time that a higher rate is to be computed. The relay may have further contacts which cause illumination of a sign indicating to the passenger that the higher rate is being charged. Thus any possibility of misapplication of rate by the driver is prevented, both in that the change in rate computation takes place automatically, and simultaneously in all so-controlled taxi cabs, but also since the passenger is aware that the higher rate is being charged. The sole function of the driver using such a radio-controlled system is to initiate the taxi meter operation when a passenger enters a cab, and to terminate that operation at the destination. The system can thus be used to provide an incentive for drivers to operate cabs at times which are normally undesirable and still completely eliminate the possibility of tampering with the equipmemnt on the part of the driver. Further this method has the advantage that a sealing of the meters by a government agency is not required, since only the central station must be controlled. Any difficulties at the central station are of course extremely unlikely, since all taxi cabs would be effected simultaneously.

An alternative method for controlling the time switch contacts are shown in FIG. 3. In this case, a time clock, such as shown in FIG. 3, is present in each vehicle. As shown in FIG. 3, a motor 2 (second motor) is driven at a constant angular velocity by means of a control arrangement 1. The motor drives a shaft 4/1 via gearing 3. It further drives a first disk, 4, which is mounted upon shaft 4/1 and is rotated in such a manner that it makes a 360° rotation per day. An indicator 5 and a scale 6 serve to indicate the time by means of the relative rotation of disk 4 relative to a starting position. Mounted on disk 4 by means of screws are a first cam 7 and a second cam 7'. The position of these cams may be adjusted. When disk 4 turns in a clockwise direction, the cams 7 and 7' activate a lever 8 which is retained on the periphery of disk 4, or in contact with the cams by means of a tension spring 8/2. Lever 8 is rotatively mounted on a shaft 8/1. Further, this lever has a bolt 8/3 on which a latch 9 is mounted rotatively. Latch 9 is retained via a tension spring 9/1 in contact with the teeth of a switching wheel 10. The switching wheel 10 is rotated in a clockwise direction by the action of cams 7, 7' and springs 8/1 and 9/1. A retaining latch 11, mounted on a lug 11/1, is retained in operative contact with a tooth of wheel 10 by means of tension spring 11/2. A shaft 12/1 is mounted for rotation with the switching wheel 10 and has mounted thereon a second disk, namely disk 12. Disk 12 has conducting means with extended portions, namely a ring of conducting material, 13, with projections therefrom in a radial direction of the disk. A first and second terminal labeled +UB and ground, respectively, are respectively connected to a wiper 15 and a wiper 14. It is seen that wiper 14 makes contact with the ring-like portion of the conducting means, while wiper 15 makes contact with the extended portions. Therefore, during the time that wiper 15 is on an extended portion of the conducting means, terminal 1 is directly connected to terminal 2, while when the wiper 15 is on the space between the extension, the terminals are disconnected from each other. Thus, depending upon the angle of rotation of disk 12, contacts 14–15 of FIG. 4 are either opened or closed. In FIG. 3, since disk 4 rotates once per day, one rate change per day occurs. Further, disk 12 rotates once a week. Thus the system can be adjusted that the night time corresponds to the spaces between extended portions of conducting means 13, while the day operation takes place with closed time switch contacts. Further, it is possible to fill in the space between conducting portions representing Saturday and Monday, thereby allowing an increased tariff to be collected on Sunday.

The explanation of stage III of FIG. 4 will now be explained, keeping in mind that regardless of the particular type of time switch arrangement used, the taxi cab is to operate at the second rate, namely with switch T2 closed when contacts 14–15 are closed and is to operate at the first rate (switch T1 closed) when contacts 14–15 are opened.

Let it first be assumed that contacts 14–15 are opened. The meter is in the position shown in FIG. 4, that is switch F is closed. At this point, if the passenger enters a cab, the driver depresses switch T, energizing relay R1 which in turn closes contacts R1.1, thereby energizing the motor. As described above, switch M1 closes and the motor continues to run until switch T1 is closed, whereupon switch M1 opens and the motor stops. The second activation of switch T upon completion of the ride, re-energizes the motor via relay R1 as described above, closes switch M1, and continues until switch T2 is closed. Here however, it is noted that a relay R3 has a coil which is connected to the energy source via the closed contact T2 and a normally closed pair of contacts R2.1 of a relay R2 which at this point is de-energized and will be further described later. Thus relay R3 is energized. The contacts R3.1 of relay R3 now close. These contacts are connected in parallel with switch T and therefore cause a re-starting of the motor exactly as is the case with depression of switch T. The motor thus continues to run until position K is reached whereupon the total fare is indicated. The driver then depresses switch T to return the meter to its original position with switch F closed.

Next, let it be assumed that contacts 14–15 are closed. In this case, it must be noted that that a relay R2 has a coil connected in series with the contact F and also with the now-closed contacts 14–15. Specifically, one terminal of the coil is connected via the above-mentioned contacts to the positive source of supply, while the other terminal is connected to ground via a resistance $R_0$. A further connection exists between the common terminal of coil R2 and resistance $R_0$ and switch terminal K. Upon start of the meter, when switch 14–15 is closed, relay R2 is therefore energized. Energization of relay R2 closes normally open contacts R2.2 which provide a holding connection for the relay to the positive side of the supply, that is they are connected in parallel with the series combination of contacts F and 14–15. Further, relay R2 switches above-mentioned contacts R2.1 from a position wherein relay coil R3 is connected to switch T2 to a position wherein said coil is connected to switch T1. Relay R3, as mentioned above, has a pair of contacts, normally open, which close upon activation of relay R3 and are in parallel with switch T. Thus, when switch 14–15 is closed, the first activation of switch T causes the motor to run until switch T1 is closed; however, in this case, closing of switch T1 results in energization of relay R3. This in turn results in closing of contact R3.1 thereby re-starting the motor and causing the motor to turn until switch T2 is closed. The fare is therefore computed at the second rate. Upon completion of the trip, the driver again activates switch T causing the motor to close switch K. Because of the connection of switch K to resistance $R_0$, a current flows through $R_0$ upon closure of switch K, deenergizing relay R2. The next depression of switch T by the driver then causes the meter to return to its original position.

It is thus seen that the system of the present invention results in a taxi meter which is free of any possibility of tampering by the driver. Further, the standard taxi meter can be used, the time-dependent operation of the meter being achieved by the addition of a separate box from which only a minimum of connections is necessary to the standard meter.

While the invention has been illustrated and described as embodied in a particular type of taxi meter and particular embodiments of the time clock, it is not intended to be limited to the details shown, since various modifications, structural and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. Taxi cab fare metering arrangement, comprising, in combination, taximeter computing means having, when activated, a first stage computing the fare at a first rate and a second stage computing said fare at a second rate; time switch means operating independently of said taximeter computing means, said time switch means having a first state for at least one predetermined time interval during a selected calender time range and a second state; and connecting means connecting said computing means and said time switch means in such a manner that, when said computing means are activated, said first stage is energized when said time switch means are in said first state and that said second stage is energized when said time switch means are in said second state.

2. An arrangement as set forth in claim 1, wherein said predetermined time interval comprises the hours from 10 P.M. to 4 A.M.; and wherein said selected calender time range comprises a 24 hour day.

3. An arrangement as set forth in claim 1, wherein said computing means comprise a first motor having a first shaft; and wherein said computing means further comprise a third stage during which no fare is computed, a fourth stage for furnishing a total fare indication; and a plurality of computer switch means activating said third stage, said first stage, said second stage, and said fourth stage in sequence during rotation of said first shaft.

4. An arrangement as set forth in claim 3, wherein said first motor has a coil; further comprising a source of energy; motor start switch means responsive to external activation for connecting said coil to said source of energy; motor control switch means for maintaining the energization of said coil when closed and de-energizing said coil when open; and motor control cam means mounted on said shaft for rotation therewith, for closing said motor control switch means upon energization of said coil and opening said motor control switch means upon energization of said first stage of said computing means.

5. An arrangement as set forth in claim 4, further comprising relay means having a relay coil, and a pair of relay contacts connected in series with said coil of said motor, said relay contacts being normally open and closing upon energization of said relay coil; wherein said motor control switch means are connected in series with said coil of said relay; and wherein said connecting means comprise means connecting said time switch means to said coil of said relay in such a manner that said relay coil remains continuously energized from said external activation until activation of said second stage of said computing means.

6. An arrangement as set forth in claim 1, wherein said taxi cab is radio controlled from central transmitting means furnishing a rate control signal; wherein said taxi cab further has radio receiver means furnishing a receiver signal in response to said rate control signal; further comprising means connecting said time switch means to said receiver means in such a manner that said time switch means are in said first state in response to said rate control signal.

7. An arrangement as set forth in claim 1, wherein said selected calendar time range comprises a week; and wherein said predetermined time interval comprises Sunday.

8. An arrangement as set forth in claim 1, further comprising indicator means for indicating the rate at which said taxi meter is computing said fare.

9. An arrangement as set forth in claim 1, wherein said time switch means comprise first disk means mounted on a shaft for rotation therewith; motor means driving said shaft continuously at a predetermined rotational speed in such a manner that said first disk means rotates 360° per day; disk cam means on said first disk means; second disk means having conducting means thereon and rotating therewith, said conducting means having a plurality of extended portions; a first and second terminal; first and second wiper means connected to said first and second terminal respectively, and mounted in operative proximity to said conducting means in such a manner that said first terminal is connected to said second terminal when said wiper means contacts said extended portions of said conducting means; and means moving said second disk means relative to said wiper means in dependence on said disk cam means.

* * * * *